(12) United States Patent
Vandeputte et al.

(10) Patent No.: US 12,228,048 B2
(45) Date of Patent: *Feb. 18, 2025

(54) TURBINE ENGINE AIRFOIL (71) Applicant: GENERAL ELECTRIC COMPANY, Schenectady, NY (US)

(72) Inventors: Thomas William Vandeputte, Scotia, NY (US); Paul Hadley Vitt, Liberty Township, OH (US); Daniel Endecott Osgood, Loveland, OH (US); Brian David Keith, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,495

(22) Filed: Oct. 16, 2023

(65) Prior Publication Data

US 2024/0167385 A1 May 23, 2024

Related U.S. Application Data

(63) Continuation of application No. 17/894,307, filed on Aug. 24, 2022, now Pat. No. 11,952,912.

(51) Int. Cl.
 *F01D 5/18* (2006.01)
 *F02C 7/12* (2006.01)
(52) U.S. Cl.
 CPC ................. *F01D 5/18* (2013.01); *F02C 7/12* (2013.01); *F05D 2260/20* (2013.01)

(58) Field of Classification Search
 CPC ........... F01D 5/18; F02C 7/12; F05D 2260/20
 See application file for complete search history.

(56) References Cited

U.S. PATENT DOCUMENTS

| | | | |
|---|---|---|---|
| 3,044,745 A | 7/1962 | Stark | |
| 4,431,376 A | 2/1984 | Lubenstein et al. | |
| 4,459,083 A | 7/1984 | Bingham | |
| 4,569,633 A | 2/1986 | Flemming, Jr. | |
| 4,776,531 A | 10/1988 | Noonan | |
| 4,830,574 A | 5/1989 | Wainauski et al. | |
| 5,911,559 A | 6/1999 | Menthe | |
| 7,785,071 B1 | 8/2010 | Liang | |
| 8,186,616 B2 | 5/2012 | Shepshelovich et al. | |
| 8,414,262 B2* | 4/2013 | Hada | F01D 5/20 416/224 |
| 8,579,590 B2* | 11/2013 | Nadvit | F01D 5/186 416/193 A |
| 9,909,426 B2* | 3/2018 | Szijarto | F01D 5/188 |
| 10,024,167 B2 | 7/2018 | Hamabe et al. | |

(Continued)

FOREIGN PATENT DOCUMENTS

| | | |
|---|---|---|
| EP | 2267276 B1 | 6/2015 |
| EP | 3231996 B1 | 6/2020 |

(Continued)

*Primary Examiner* — Jesse S Bogue
(74) *Attorney, Agent, or Firm* — McGarry Bair PC (57) ABSTRACT

A turbine engine includes a compressor section, a combustion section, and a turbine section, and an airfoil with an outer wall defining a pressure side and a suction side and extending between a leading edge and a trailing edge to define a mean camber line. A first thickness is defined between the pressure side and the suction side at a first location along the mean camber line.

20 Claims, 6 Drawing Sheets

(56) References Cited

U.S. PATENT DOCUMENTS

| | | | |
|---|---|---|---|
| 10,280,756 B2 | 5/2019 | Nash et al. | |
| 10,376,950 B2 * | 8/2019 | Takamura | F01D 5/18 |
| 10,718,311 B2 | 7/2020 | Shah et al. | |
| 10,753,217 B2 | 8/2020 | Nishimura et al. | |
| 10,801,325 B2 * | 10/2020 | Mongillo | F01D 5/141 |
| 11,339,669 B2 * | 5/2022 | Tsuji | F01D 9/065 |
| 11,365,638 B2 * | 6/2022 | Williamson | F01D 5/18 |
| 11,473,434 B2 | 10/2022 | Nash et al. | |
| 11,905,848 B2 * | 2/2024 | Hatta | B23H 9/10 |
| 2011/0202321 A1 * | 8/2011 | Lung | F04D 27/001 |
| | | | 703/1 |
| 2012/0070308 A1 * | 3/2012 | Naik | F01D 5/20 |
| | | | 416/97 R |
| 2018/0231018 A1 | 8/2018 | Smith et al. | |
| 2020/0141244 A1 | 5/2020 | Balzer et al. | |
| 2021/0215050 A1 | 7/2021 | Vandeputte | |

FOREIGN PATENT DOCUMENTS

| | | |
|---|---|---|
| WO | 2010057627 A1 | 5/2010 |
| WO | 2020055387 A1 | 3/2020 |

\* cited by examiner

TURBINE ENGINE AIRFOIL

CROSS-REFERENCE TO RELATED APPLICATION(S)

This application is a continuation of U.S. patent application Ser. No. 17/894,307, filed Aug. 24, 2022, now U.S. Pat. No. 11,952,912, issued Apr. 9, 2024, which is incorporated herein by reference in its entirety.

TECHNICAL FIELD

The present disclosure relates to a turbine engine airfoil, and more specifically to a cooled airfoil having a tailored near-trailing-edge thickness.

BACKGROUND

A gas turbine engine for commercial aircraft typically includes a fan and a turbomachine. The turbomachine, which is commonly referred to as the core, generally includes a compressor section, a combustor section, and a turbine section in serial flow arrangement. The compressor section compresses air which is channeled to the combustor section where it is mixed with fuel. The mixture is then ignited for generating hot combustion gases. The combustion gases are channeled to the turbine section which extracts energy from the combustion gases for powering the compressor section, as well as for producing work, such as for propulsion of an aircraft in flight, or for powering a load such as an electrical generator.

Turbine engines are often designed to operate at high temperatures to improve engine efficiency. Cooling measures are often provided for engine components such as airfoils in the high-temperature environment, where such cooling measures can reduce material wear, improve component lifetimes, and provide for increased structural stability during engine operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the present disclosure are generally directed to an airfoil. For purposes of illustration, the present disclosure will be described with respect to a turbine airfoil in the context of an aircraft gas turbine engine. It will be understood, however, that aspects of the disclosure herein are not so limited and may have general applicability, including within other engines, as well as in non-aircraft applications, such as other mobile applications and non-mobile industrial, commercial, and residential applications.

Reference will now be made in detail to the turbine engine and airfoil, one or more examples of which are illustrated in the accompanying drawings. The detailed description uses numerical and letter designations to refer to features in the drawings.

As used herein, the terms "first", "second", and "third" may be used interchangeably to distinguish one component from another and are not intended to signify location or importance of the individual components.

As used herein, the terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward refers to upstream and aft/rearward refers to downstream.

As used herein, the term "fluid" may be a gas or a liquid, or multi-phase. The term "fluid communication" or "fluidly coupled" means that a fluid is capable of making the connection or coupling between the areas specified.

As used herein, the terms "radial" or "radially" refer to a direction away from a common center. For example, in the overall context of a turbine engine, radial refers to a direction along a ray extending between a center longitudinal axis of the engine and an outer engine circumference.

As used herein, the singular forms "a", "an", and "the" include plural references unless the context clearly dictates otherwise. Furthermore, as used herein, the term "set" or a "set" of elements can include any number of elements, including only one.

As used herein, "pressure drop" across an obstacle refers to the change in fluid total pressure that occurs when the fluid passes through the obstacle. Total pressure drop over a measurement boundary is typically characterized by a pressure loss coefficient, Yp. Yp is determined by Expression 1 below and is typically expressed as a percentage:

$$Yp = \frac{PT_1 - PT_2}{PT_0 - PS_1} \qquad (1)$$

where PT1 refers the fluid's average total pressure upstream of the obstacle, PT2 refers to the fluid's average total pressure downstream of the obstacle, PT0 refers to the inlet total pressure at the measurement boundary, and PS1 refers to the exit static pressure at the measurement boundary.

As used herein, "thickness" refers to a thickness of a component wall in some examples, or to a thickness across a component in some examples.

As used herein, "mean camber line" is in reference to a line positioned halfway between an airfoil upper surface (e.g. a suction side) and an airfoil lower surface (e.g. a pressure side). Such a mean camber line intersects the airfoil chord at the airfoil leading edge and at the airfoil trailing edge.

As used herein, "cooling performance" is in reference to an amount of cooling provided to a component by way of a given amount of fluid flow. High cooling performance indicates that a low cooling air flow to a component is required to achieve a required component metal temperature. Conversely, low cooling performance indicates that a high cooling air flow is required to achieve the same required component metal temperature.

As used herein, "specific fuel consumption" or "SFC" is in reference to engine specific fuel consumption, which relates to engine efficiency. SFC represents a combined impact of at least aerodynamic efficiency, characterized for an airfoil by total pressure loss, and cooling performance (total cooling air flow). SFC is higher (worse) when total pressure loss (Yp) is higher, and/or when cooling performance is lower (cooling air flow is higher to maintain a component metal temperature).

As used herein, "thickness parameter" (denoted "τ") represents a relationship between two thicknesses taken across an airfoil, and a distance between those two thicknesses taken along the mean camber line of the airfoil, as described herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

In certain exemplary embodiments of the present disclosure, a gas turbine engine defining a centerline and a circumferential direction about the centerline is provided. The gas turbine engine may generally include a compressor section, a combustion section, and a turbine section in serial flow arrangement along the centerline. The gas turbine engine can define a substantially annular flow path relative to the centerline. The gas turbine engine includes at least one airfoil, such as a turbine blade positioned within the flow path. Aspects of the disclosure as described herein can have applicability to airfoils in the compressor section or the turbine section.

Traditional airfoil design generally occurs in a linear or iterative manner, beginning with aerodynamic design, where the airfoil geometry or shape is designed to minimize a total pressure drop through the working fluid flow path, and followed by cooling design, where an amount of cooling flow needed to achieve desired material temperature limits is established. In some examples, turbine airfoils generally operate in environments above 1000° C., requiring cooling flow even with the application of superalloy metallurgy.

Engine specific fuel consumption (SFC) and efficiency are dependent on both aerodynamic design and cooling design. In one example, SFC is determined as follows:

$$SFC \propto \dot{m}/T \qquad (1)$$

where $\dot{m}$ refers to mass flow rate of fuel, and T refers to a net thrust for the engine.

Aerodynamic losses due to the airfoil geometry or shape reduce engine efficiency and increase fuel consumption. In addition, airfoil cooling designs utilize cooling air extracted from the turbine engine airstream that could otherwise be utilized within the main flow path for power extraction.

More specifically, airfoil trailing edge designs have a significant effect on engine SFC regarding both aerodynamic design and cooling design. Cooling effectiveness increases as the cooling features, such as film holes, move closer to the trailing edge. However, the airfoil and trailing edge become thicker to accommodate these features, which reduces the aerodynamic performance (higher total pressure loss, lower efficiency). In the traditional linear design process detailed above, the aerodynamic shape is typically first defined to minimize total pressure loss (e.g. to maximize efficiency and minimize SFC), within casting limits. Cooling features are then typically fit within the resulting airfoil profile. Cooling air flow levels are adjusted higher until the target metal temperature criteria is satisfied. The higher cooling air flow levels also result in increased SFC. In this manner, these competing effects lead to a trade-off between aerodynamic and cooling design considerations.

In light of the above, the inventors' practice has proceeded in the manner of designing an airfoil by concurrently considering aerodynamic performance and cooling performance by using SFC as a system-level figure of merit that combines the net impact of the competing effects. Airfoil design features, such as the trailing edge diameter and distribution of airfoil thickness upstream of the trailing edge are specified. Cooling features are then located in the aft-most location allowed by the geometric definition. The net airfoil design is then evaluated for both aerodynamic performance and for cooling performance. Aerodynamic performance is assessed, for example, via computational fluid dynamics (CFD) modeling or cascade testing. Cooling performance is then assessed, for example via computational modeling with calibrated empirical models or high fidelity CFD modeling such as large eddy simulation (LES). Using engine cycle information, the aerodynamic and cooling performance are translated to an engine SFC. Several iterations of airfoil geometry adjustment and SFC assessment are performed, sometimes with the added implementation of advanced machine learning algorithms, to arrive at the most optimal SFC for that particular turbine airfoil. The above-described iterative process can continue for long periods of time until a workable airfoil design is identified.

Figure 1:
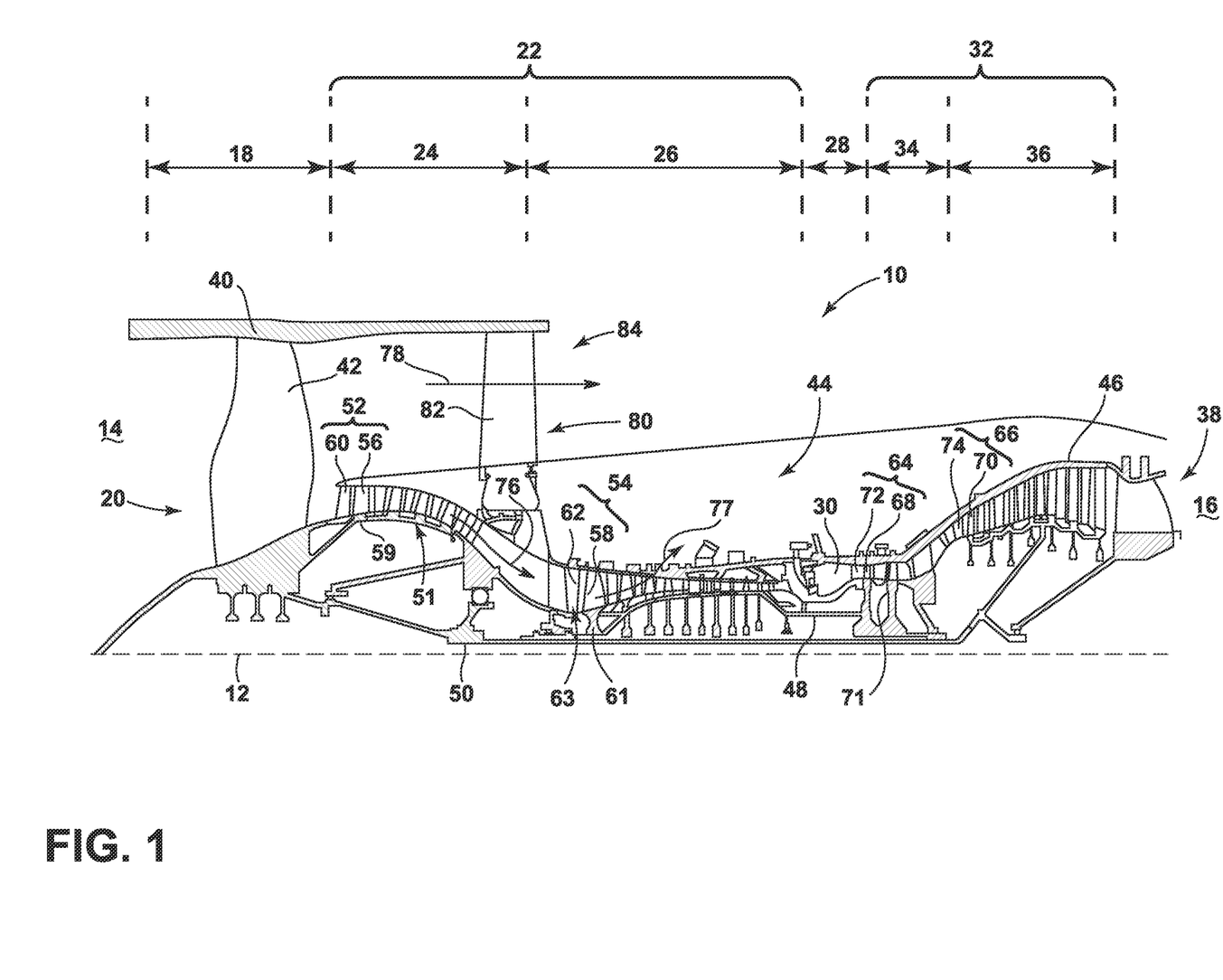
FIG. 1 is a schematic cross-sectional view of a turbine engine in accordance with various aspects described herein.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which is coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which collectively define a rotor 51.

While not illustrated, it will be appreciated that the engine 10 can include other components, such as, but not limited to a gearbox. The gearbox can be located at any suitable position within the turbine engine such that it connects one rotating portion to another. The gearbox can connect the fan 20 to the LP spool 50. The gearbox can allow the fan 20 to run at a different speed than the remainder of the engine 10.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor are mounted to a disk 61, which is mounted to the corresponding one of the HP and LP spools 48, 50, with each stage having its own disk 61. The blades 56, 58 can also be part of a blisk, rather than being mounted to a disk. The vanes 60, 62 for a stage of the compressor are mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The vanes 72, 74 for a stage of the compressor are mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 refers to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air 76 is drawn from the compressor section 22 as bleed air 77. The bleed air 77 can be provided to engine components requiring cooling. The temperature of pressurized air 76 entering and exiting the combustor 30 is significantly increased. As such, cooling provided by the bleed air 77 is supplied to downstream turbine components (e.g., a blade 68) subjected to the heightened temperature environments.

A remaining portion of the airflow exiting the fan section, a bypass airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
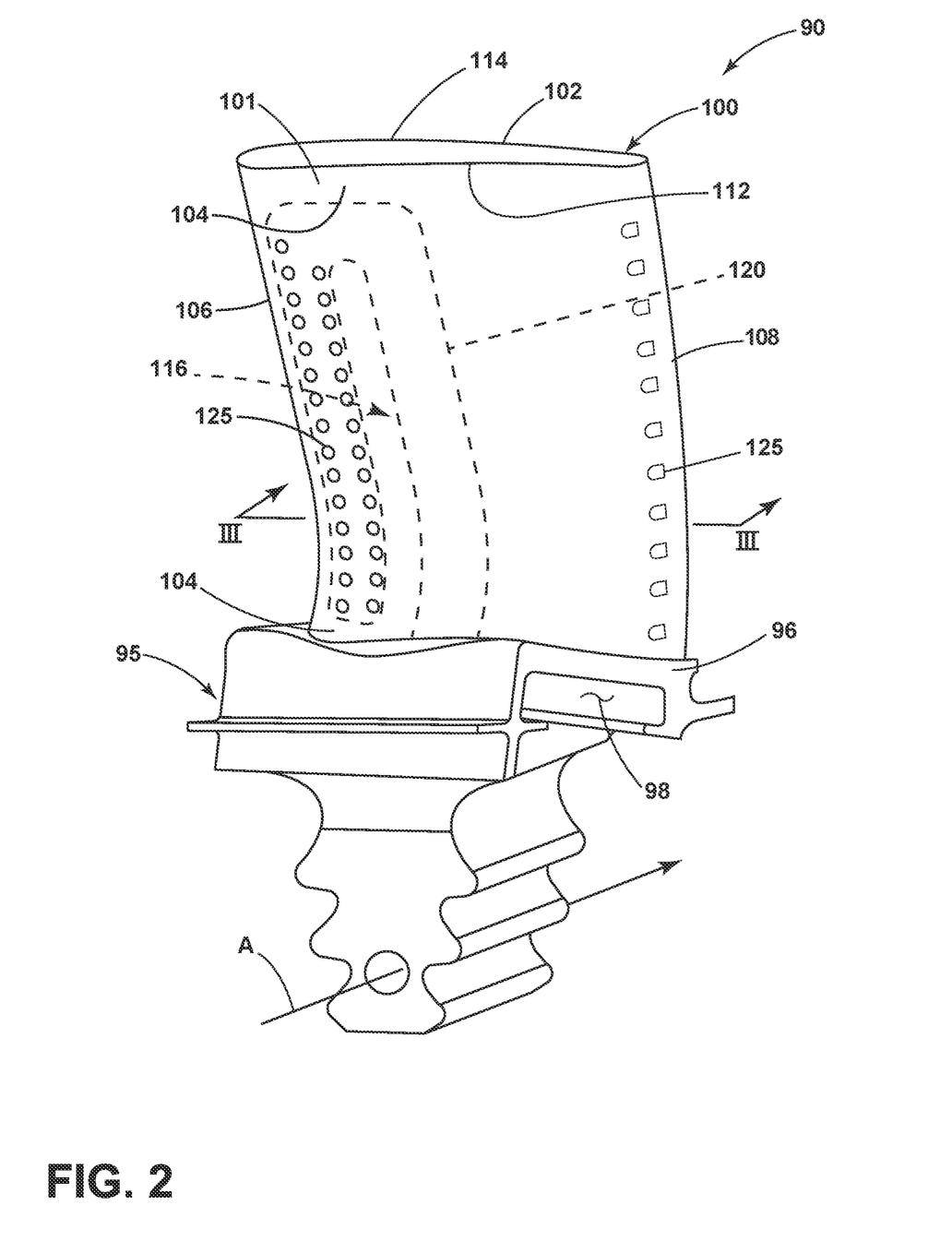
FIG. 2 is a perspective view of an airfoil assembly that can be utilized in the turbine engine of FIG. 1 in accordance with various aspects described herein.

FIG. 2 is a perspective view of an exemplary airfoil assembly 90 that can be utilized in the engine 10 (FIG. 1). In the illustrated example, the airfoil assembly 90 includes a dovetail 95 and an airfoil 100 in the form of a blade. The airfoil assembly 90 can correspond to one of the blades 56, 58, 68, 70 or vanes 60, 62, 72, 74 (FIG. 1). In some examples, the airfoil assembly 90 includes endwalls or inner or outer bands in place of the dovetail 95.

The airfoil assembly 90 is formed from a material suitable for the operating environment. Materials used to form the airfoil assembly 90 can include, but are not limited to, steel, refractory metals such as titanium, or superalloys based on nickel, cobalt, or iron, and ceramic matrix composites. The airfoil assembly can be formed by a variety of methods, including additive manufacturing, casting, electroforming, or direct metal laser melting, in non-limiting examples. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

The dovetail 95 includes a platform 96 on which the airfoil 100 is mounted. When multiple airfoils are circumferentially arranged in side-by-side relationship, the platform 96 helps to radially contain the turbine engine mainstream air flow and forms the radially inner wall of an annulus through which the air flows. The dovetail 95 is configured to mount to the turbine rotor disk 71 on the engine 10 (FIG. 1). In the illustrated example, the dovetail 95 is oriented to mount to the turbine rotor disk 71 (FIG. 1) along an axial direction (A). The dovetail 95 further includes at least one inlet passage 98 extending through the dovetail 95 to provide internal fluid communication with the airfoil 100.

The airfoil 100 includes an outer wall 101 extending between a tip 102 and a root 104 to define a span-wise direction (S). The outer wall 101 also extends between a leading edge 106 forming an upstream edge and a trailing edge 108 forming a downstream edge as shown.

The outer wall 101 of the airfoil 100 includes a first side, illustrated as a concave-shaped pressure side 112, and a second side, illustrated as a convex-shaped suction side 114. An outer periphery of the airfoil 100 is bound by the outer wall 101.

The outer wall 101 can face a hot gas flow. An interior 116 of the airfoil 100 includes at least one cooling supply conduit 120, illustrated in dashed line. The at least one cooling supply conduit 120 is fluidly coupled with the inlet passage 98 of the dovetail 95. A cooling fluid flow is supplied from the at least one cooling supply conduit 120. At least one cooling hole 125 is located in the outer wall 101. The at least one cooling hole 125 can be provided anywhere along the outer wall 101, including along the leading edge 106, trailing edge 108, pressure side 112, or suction side 114.

Figure 3:
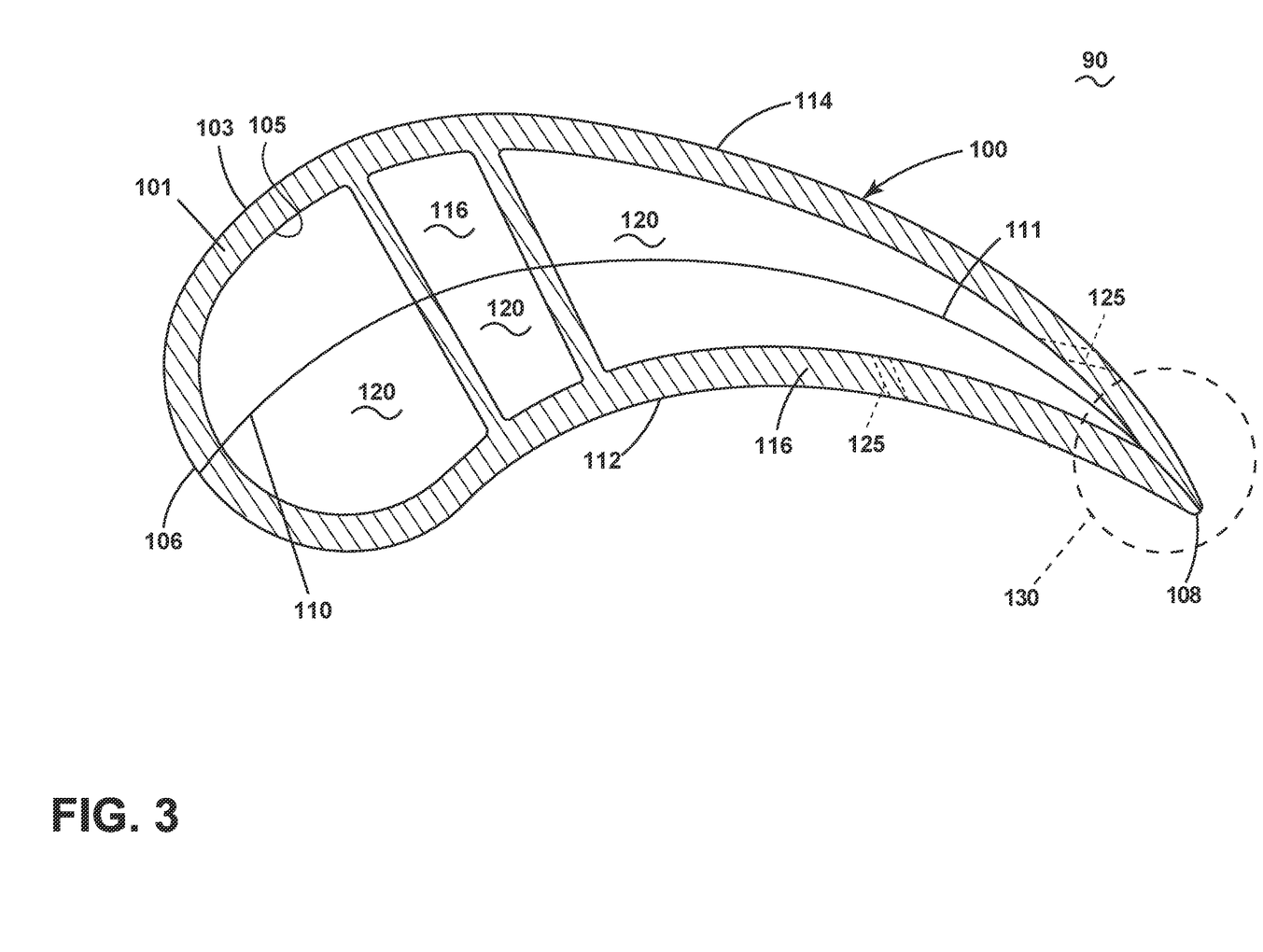
FIG. 3 is a cross-sectional view of the airfoil assembly of FIG. 2.

FIG. 3 illustrates a cross-section of the airfoil 100 taken along line III-III of FIG. 2. The outer wall 101, including the pressure side 112 and suction side 114, collectively defines an airfoil cross-sectional shape or geometric profile of the airfoil 100.

A mean camber line 110 extends between the leading edge 106 and trailing edge 108 as shown. In addition, the outer wall 101 is illustrated as being generally solid though this need not be the case. It will be understood that the outer wall 101 can include interior chambers, plenums, gaps, in-wall cooling, or the like. The mean camber line 110 defines a camber length 111 between the leading edge 106 and trailing edge 108.

The outer wall 101 also defines an exterior surface 103 and an interior surface 105. The interior surface 105 confronts the interior 116 and is also fluidly coupled to the interior 116 as shown.

The at least one cooling hole 125 extends through the outer wall 101 and is fluidly coupled to the at least one cooling supply conduit 120. In the illustrated example, two cooling holes 125 are shown, although one or more can be provided, and cooling holes 125 can be positioned on any portion of the outer wall 101.

In addition, in the illustrated example the at least one cooling supply conduit 120 forms three interior chambers within the outer wall 101. In some examples, the at least one cooling supply conduit 120 is a continuous conduit such that the three interior chambers form part of a common conduit. In some examples, the at least one cooling supply conduit 120 includes multiple, separated conduits forming the chambers as shown. Any number of chambers can be provided.

Figure 4:
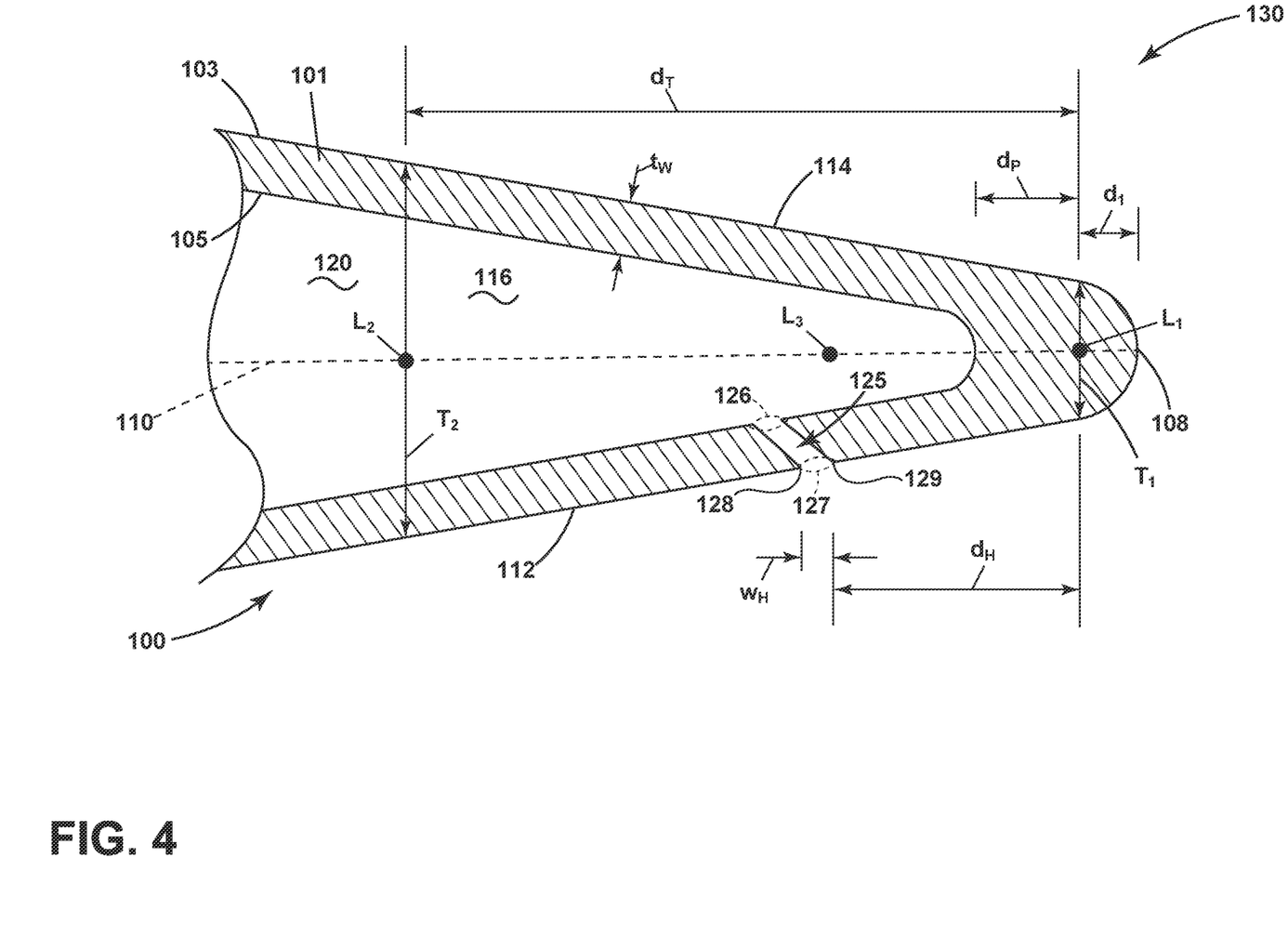
FIG. 4 is a cross-sectional view of a trailing edge portion of the airfoil assembly of FIG. 3.

Turning to FIG. 4, a portion 130 of the airfoil in FIG. 3 is enlarged to show further detail. The portion 130 includes a near-trailing-edge region of the airfoil 100. In some examples, the portion 130 includes 0-20% of the mean camber line 110.

The trailing edge 108 is illustrated with a generally circular geometric profile though this need not be the case. The trailing edge 108 can also include an elliptical profile, or a combination of circular and elliptical profiles, or a tapered profile, or a flattened or truncated profile, or the like.

The mean camber line 110 is illustrated in dashed line. While the mean camber line 110 is shown as a straight line in the illustrated example, it will be understood that the mean camber line 110 can be curved. In some examples, the mean camber line 110 is locally straight or linear in the near-trailing-edge region within the portion 130. In addition, while the outer wall 101 in the portion 130 is illustrated as being solid, this need not be the case and the outer wall 101 can include hollow regions, plenums, or the like as described in FIG. 3.

A first thickness $T_1$ is defined between the pressure side 112 and the suction side 114 at a first location $L_1$ as shown. The first location $L_1$ is along the mean camber line 110. The first thickness $T_1$ refers to a thickness measured between exterior surfaces 103 at the first location $L_1$, in a direction perpendicular to the mean camber line 110. In addition, the first location $L_1$ is spaced from the trailing edge 108 along the mean camber line 110 to define a first distance $(d_1)$. In some examples, the first distance di is between 0-10% of the camber length 111 (FIG. 3). As shown, the first thickness $T_1$ is in a range between 1-5 mm, and the first distance $d_1$ is in a range between 4-8 mm.

A second thickness $T_2$ is defined between the pressure side 112 and the suction side 114 at a second location $L_2$ as shown. The second location $L_2$ is along the mean camber line 110. In the example shown, the second location $L_2$ is positioned farther from the trailing edge than the first location $L_1$. The second thickness $T_2$ refers to a thickness measured between exterior surfaces 103 at the second location $L_2$, in a direction perpendicular to the mean camber line 110. The second thickness T2 is in a range between 2-10 mm.

In addition, a distance $(d_T)$ is defined between the first location $L_1$ and the second location $L_2$. The distance $d_T$ is defined along the mean camber line 110. In some examples where the mean camber line 110 is curved between the first location $L_1$ and the second location $L_2$, the distance $d_T$ can also be curved. It will be understood that the first location $L_1$ and second location $L_2$ can be offset from one another in some examples. For example, the pressure side 112 and suction side 114 can be asymmetric about the mean camber line 110 with respect to one another, such that the mean camber line 110 is curved between the first location $L_1$ and second location $L_2$.

A wall thickness ($t_W$) is defined between the exterior surface 103 and the interior surface 105 as shown. In the non-limiting example shown, the wall thickness $t_W$ is 2 mm. In addition, a plenum distance ($d_P$) is defined between the interior surface 105 and the first location $L_1$. In the non-limiting example shown, the plenum distance $d_P$ is 5 mm. In some examples, the plenum distance $d_P$ is defined as the shortest distance between the interior surface 105 and first location $L_1$ along the mean camber line 110. In some examples, the plenum distance $d_P$ is be a straight-line distance, or approximately a straight-line distance, such as within 5-20% of a straight-line distance. The plenum distance $d_P$ can also be a curved or nonlinear distance along the mean camber line 110 in some examples.

One exemplary cooling hole 125 is illustrated in the outer wall 101. The cooling hole 125 is in the same plane as the cross-section shown in FIG. 4. The cooling hole 125 extends between an inlet 126 on the interior surface 105 and an outlet 127 on the exterior surface 103. The inlet 126 is fluidly coupled to the interior 116 of the airfoil 100. While the cooling hole 125 is shown as a generally straight hole extending through the outer wall 101, it will be understood that the cooling hole 125 can have other geometries including a slot, diffusing section, metering section, curved section, or the like. In addition, the outlet 127 of the cooling hole 125 is illustrated on the pressure side 112, and it is contemplated that the cooling hole 125 can also be positioned on the suction side 114.

The outlet 127 defines a forward edge 128 and an aft edge 129, with the aft edge 129 positioned closer to the trailing edge 108. A cooling hole width ($w_H$) is defined at the outlet 127 between the forward edge 128 and the aft edge 129. The cooling hole width $w_H$ is defined along the mean camber line 110 as shown.

The cooling hole 125 also defines a third location ($L_3$) along the mean camber line 110. In some examples the third location $L_3$ is defined by the aft edge 129, though this need not be the case. The third location $L_3$ can also be defined by the forward edge 128, or with respect to the inlet 126, or with respect to a centerline defined along the cooling hole 125, in non-limiting examples. In addition, the cooling hole 125 defines a cooling hole distance ($d_H$) along the mean camber line 110 between the third location $L_3$ and the first location $L_1$. It is contemplated in some examples that the airfoil 100 includes a rapid thickness expansion, e.g. first thickness T1 and second thickness T2, forward from the trailing edge 108. Such thickness expansion can provide for cooling features, such as the cooling hole 125, being positioned closer to the trailing edge 108 compared to traditional airfoils. In some non-limiting examples, the cooling hole distance de is in a range between 0.01-0.1 cm. Such an arrangement provides increased cooling effectiveness directly adjacent the trailing edge 108.

Figure 5:
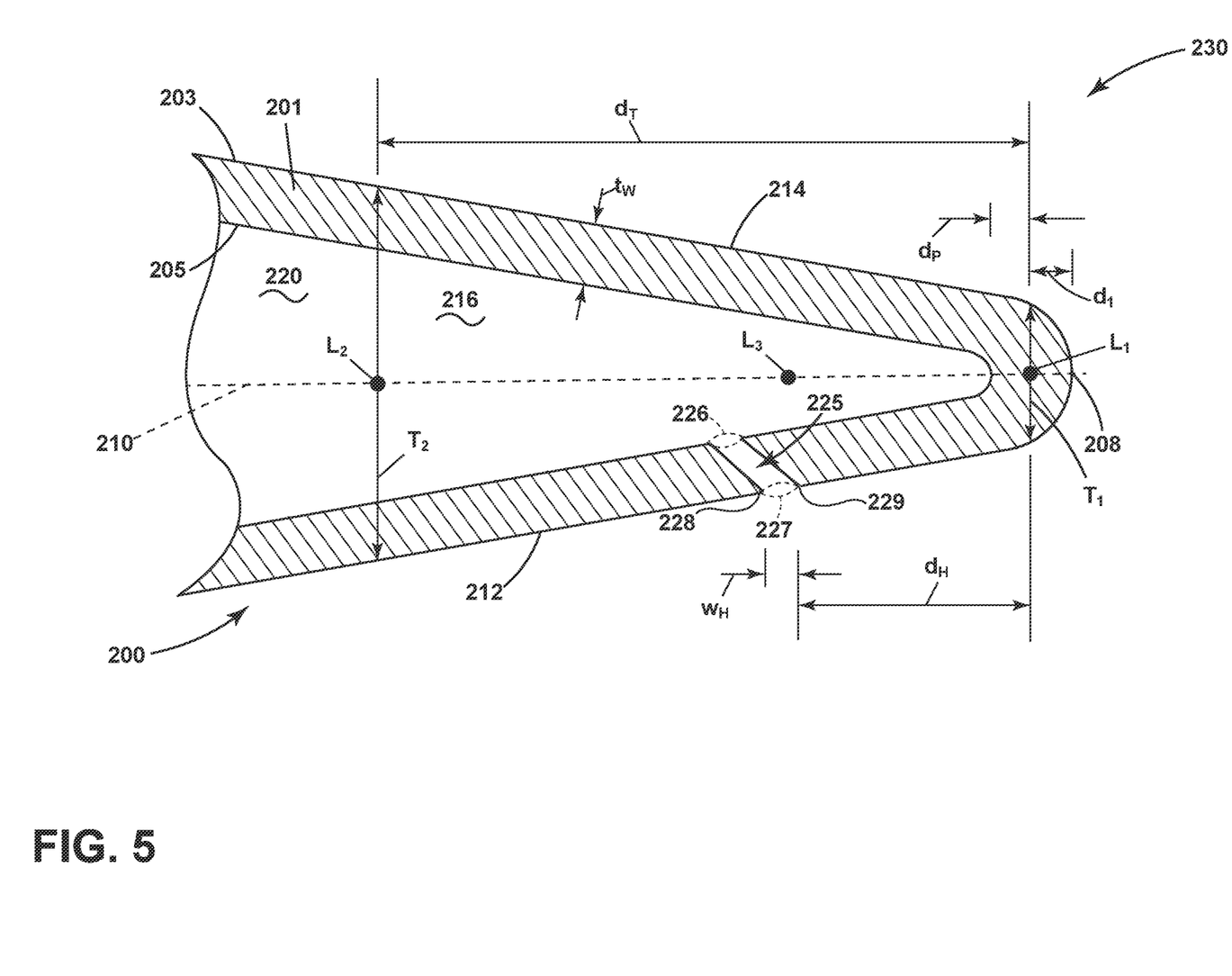
FIG. 5 is a cross-sectional view, similar to FIG. 4, of another trailing edge portion of another airfoil assembly that can be utilized in the turbine engine of FIG. 1.

Referring now to FIG. 5, another airfoil 200 is illustrated that can be utilized in the engine 10 of FIG. 1. Therefore, like parts will be described with like numerals increased by 100, with it being understood that the description of the like parts of the airfoil 100 applies to the airfoil 200, except where noted.

An enlarged portion 230 of the airfoil 200, similar to the portion 130 (FIG. 3), is illustrated. The portion 230 includes a near-trailing-edge region of the airfoil 200. The airfoil 200 includes an outer wall 201 bounding an interior 216 and having an exterior surface 203, an interior surface 205, a trailing edge 208, a pressure side 212, and a suction side 214. A cooling conduit 220 extends within the interior 216. A mean camber line 210 extends between the leading edge (not shown in FIG. 4) and the trailing edge 208. In some examples, the portion 230 includes 0-20% of the mean camber line 210. In addition, a cooling hole 225 is provided in the outer wall 201 extending between an inlet 226 and an outlet 227 as shown. The inlet 226 is fluidly coupled to the cooling conduit 220.

A first thickness $T_1$ is defined between the pressure side 212 and the suction side 214 at a first location $L_1$ as shown. The first location $L_1$ is spaced from the trailing edge 208 along the mean camber line 210 to define a first distance $d_1$. One difference is that the airfoil 200 can have a larger first thickness $T_1$ compared to the airfoil 100. As shown, the first thickness $T_1$ is in a range between 5-10 mm.

A second thickness $T_2$ is defined between the pressure side 212 and the suction side 214 at a second location $L_2$ as shown. Another difference is that the airfoil 200 can have a larger second thickness $T_2$ compared to the airfoil 100. As shown, the second thickness is in a range between 10-14 mm.

In addition, a distance $d_T$ is defined between the first location $L_1$ and the second location $L_2$ along the mean camber line 210. A wall thickness $t_W$ is also defined between the exterior surface 203 and the interior surface 205 as shown. Another difference is that the airfoil 200 can have a larger wall thickness $t_W$ compared to the airfoil 100. As shown, the wall thickness is 4 mm.

A plenum distance $d_P$ is defined between the interior surface 205 and the first location $L_1$. Another difference is that the airfoil 200 can have a smaller plenum distance $d_P$ compared to the airfoil 100. As shown, the plenum distance $d_P$ is 1 mm.

The outlet 227 can define a forward edge 228 and an aft edge 229. A cooling hole width $w_H$ is defined at the outlet 227 between the forward edge 228 and the aft edge 229. The cooling hole width $w_H$ is defined along the mean camber line 210 as shown. The cooling hole 225 also defines a cooling hole distance $d_H$ along the mean camber line 210 between the aft edge 229 and the second location $L_2$.

With general reference to FIGS. 1-5, it can be appreciated that the airfoils 100, 200 are but two illustrative examples, among many others, having design parameters that provide a desired balance between aerodynamic performance and cooling performance. In one non-limiting example, the airfoil 100 has a higher aerodynamic performance compared to the airfoil 200, while the airfoil 200 has a higher cooling performance compared to the airfoil 100, though this need not be the case.

As described earlier, finding a workable airfoil solution involves first designing the airfoil for aerodynamic performance, and then adjusting the design based on cooling needs, which may result in an unfavorable system performance as assessed through the evaluation of SFC. This is a labor- and time-intensive process, because the process is iterative and requires finding the airfoil that exhibits both desirable aerodynamic performance and cooling performance. The goal is to improve SFC, but there are many trade-offs to take into account. It is desirable to have a limited or narrowed range of embodiments defined for an engine architecture and satisfying design requirements.

Table 1 below illustrates some non-limiting examples of airfoil designs that yielded workable solutions for the problem of balancing aerodynamic and cooling performance for a given engine architecture. A pressure loss coefficient Yp relating to aerodynamic performance is also provided for each airfoil example.

TABLE 1

| | Example: | | | | | | | | |
|---|---|---|---|---|---|---|---|---|---|
| | 1 | 2 | 3 | 4 | 5 | 6 | 7 | 8 | 9 |
| $T_1$ (cm) | 0.224 | 0.147 | 0.155 | 0.224 | 0.178 | 0.269 | 0.224 | 0.185 | 0.162 |
| $T_2$ (cm) | 0.381 | 0.353 | 0.384 | 0.605 | 0.693 | 0.488 | 0.486 | 0.490 | 0.478 |
| $d_T$ (cm) | 0.559 | 0.605 | 0.805 | 1.313 | 1.156 | 0.796 | 0.700 | 1.108 | 0.968 |
| $d_P$ (cm) | 0.013 | 0.064 | 0.000 | 0.013 | 0.102 | 0.102 | 0.102 | 0.102 | 0.102 |
| $d_H$ (cm) | 0.533 | 0.185 | 0.048 | 0.127 | 0.267 | 0.267 | 0.267 | 0.267 | 0.267 |
| $w_H$ (cm) | 0.076 | 0.104 | 0.048 | 0.102 | 0.089 | 0.089 | 0.089 | 0.089 | 0.089 |
| $d_1$ (cm) | 0.188 | 0.117 | 0.140 | 0.188 | 0.178 | 0.219 | 0.190 | 0.286 | 0.152 |
| Yp | 3.2% | 2.9% | 3.0% | 3.2% | 2.4% | 3.4% | 3.1% | 3.1% | 3.0% |

Unless stated otherwise, all units given in this disclosure are in centimeters (cm) when not given as dimensionless.

The inventors discovered that a relationship exists between the first thickness $T_1$, second thickness $T_2$, and the distance $d_T$ for airfoil designs that yielded improved results. Referred to herein as a thickness parameter ($\tau$), this relationship was an unexpected discovery during the course of engine design—i.e., design of airfoils within the engine and evaluating the impact that the resulting airfoils would have on the engine fuel consumption or efficiency. Moreover, by utilizing this relationship, the inventors found that the number of suitable or workable airfoil examples for placement in a turbine engine and capable of meeting the design requirements could be greatly reduced, thereby facilitating a more rapid down-selection of airfoil designs to consider as an engine is being developed. The discovered relationship also avoids or prevents late-stage redesign while also providing an airfoil design that integrates both efficient performance and cooling effectiveness. The discovered relationship enables a narrowing down of options during the design process, providing for time savings, reduced material costs, and an improved airfoil design for a variety of engine architectures.

It was found that the thickness parameter $\tau$ balances the desirability of both aerodynamic performance and cooling performance. The thickness parameter $\tau$ is represented as follows:

$$\tau = \left(\frac{T_2}{T_1} - 1\right)/R_1 \quad (3)$$

where $R_1$ is a ratio defined by the first thickness $T_1$ and the distance $d_T$:

$$R_1 = d_T/T_1 \quad (4)$$

The thickness parameter $\tau$ is between 0.275 and 0.45 ($0.275 \leq \tau \leq 0.45$) when the first ratio $R_1$ is between 2.5 and 6.5 ($2.5 \leq R_1 \leq 6.5$).

It is understood that the relationship between the thickness parameter $\tau$, distance $d_T$, first thickness $T_1$, and second thickness $T_2$ as described in Expression 3 and Expression 4 can also be expressed in an alternate simplified form as follows:

$$\tau d_T + T_1 = T_2 \quad (5)$$

In this manner, the relationship as shown in Expressions 3-4 includes dimensionless ratios, whereas the relationship as shown in Expression 5 includes dimensioned terms. Regardless of the expression form, the thickness parameter $\tau$ itself is a dimensionless parameter.

Some exemplary values corresponding to the examples in Table 1 for the thickness parameter $\tau$, first ratio $R_1$, and a ratio of the second thickness $T_2$ to the first thickness $T_1$, satisfying the relationship as shown in Expressions 3-4, are provided in Table 2 below:

TABLE 2

| | Example: | | | | | | | | |
|---|---|---|---|---|---|---|---|---|---|
| | 1 | 2 | 3 | 4 | 5 | 6 | 7 | 8 | 9 |
| $\tau$ | 0.275 | 0.341 | 0.285 | .290 | 0.450 | 0.275 | 0.375 | 0.275 | 0.325 |
| $R_1$ | 2.5 | 4.1 | 5.2 | 5.9 | 6.5 | 3.0 | 3.0 | 6.0 | 6.0 |
| $T_2/T_1$ | 1.7 | 2.4 | 2.5 | 2.7 | 3.9 | 1.8 | 2.2 | 2.7 | 2.9 |

Utilizing this relationship as described in Expressions 3-4 (or, alternately, Expression 5), the inventors were able to arrive at a better performing airfoil in terms of cooling performance with acceptable aerodynamic performance.

It is further contemplated that the first location $L_1$ is determined along the mean camber line 110 based on a rate of change of surface curvature of the exterior surface 103. In some examples, the first location $L_1$ is determined where the rate of change of surface curvature exceeds a predetermined threshold value. In some examples, the pressure side 112 and suction side 114 are each treated as unwrapped curves $R\theta$ of the following expression between the leading edge 106 and trailing edge 108:

$$R\theta = f(s) \quad (6)$$

where s represents the surface distance along the pressure side 112 or suction side 114 as measured from the leading edge 106.

A curvature (k) for the exterior surface 103 is represented as follows:

$$k = \frac{f(s)''}{\left(1 + f(s)'^2\right)^{3/2}} \quad (7)$$

Where f (s)" is the second derivative with respect to the horizontal axis 210 in FIG. 5. And a rate of change of curvature (k') is represented as follows:

$$k' = \frac{\Delta k}{\Delta s} \quad (8)$$

The curvature k has units of inverse length, such as $cm^{-1}$. The rate of change of surface curvature k' has units of inverse length squared, such as $cm^{-2}$.

With reference to Expressions 6-8, the curvature k of the exterior surface 103 transitions from the suction side 114 curve to the trailing edge 108 curve, or from the pressure side 112 curve to the trailing edge 108 curve. Such a transition is determined where the rate of change of surface curvature k' exceeds a predetermined threshold. In some examples, the first location $L_1$ is determined along the mean camber line 110 where the absolute value of rate of change of surface curvature k' exceeds 960 cm$^{-2}$ (|k'|>960 cm$^{-2}$) on the exterior surface 103. In this manner, the first location $L_1$ demarcates along the mean camber line 110 a transition between the pressure side 112 and the trailing edge 108, or at a transition between the suction side 114 and the trailing edge 108.

It is further contemplated that the cooling hole distance $d_H$ and the first thickness $T_1$ define a second ratio ($R_2$):

$$R_2 = d_H/T_1 \qquad (9)$$

where the second ratio $R_2$ is between 0.3 and 3.0 ($0.3 \leq R_2 \leq 3.0$).

It is further contemplated that the cooling hole width $w_H$ (defined along the mean camber line 110 between the forward edge 128 and the aft edge 129, as described above) and the first thickness $T_1$ define a third ratio ($R_3$):

$$R_3 = w_H/T_1 \qquad (10)$$

where the third ratio $R_3$ is between 0.3 and 3.0 ($0.3 \leq R_3 \leq 3.0$).

Figure 6:
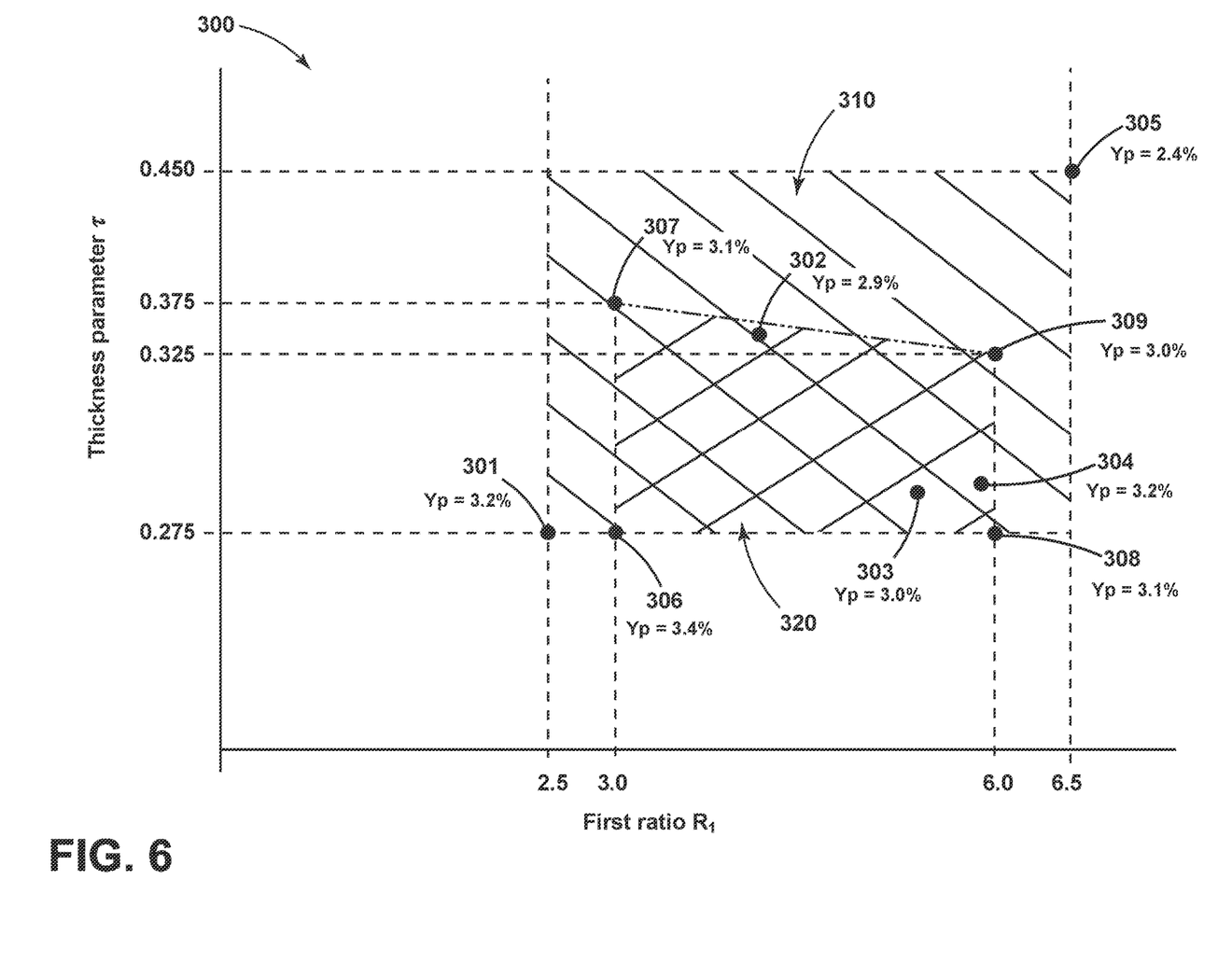
FIG. 6 is a plot illustrating a parameter space for an airfoil assembly in accordance with various aspects described herein.

Turning now to FIG. 6, a plot 300 is shown wherein the thickness parameter $\tau$ is plotted against the first ratio $R_1$ as shown. A first space 310 covered by Expressions 3-4 (or alternately by Expression 5) is illustrated with a first shaded region. A second space 320 is illustrated with a second shaded region. The second space 320 is bounded by a trapezoidal region defined by embodiments having values for ($R_1$, $\tau$) between (3.0, 0.275), (3.0, 0.375), (6.0, 0.275), and (6.0, 0.325). The second space 320 represents a subset or narrowed boundary within the first space 310.

The airfoil examples 1-9 as described in Tables 1-2 above are shown in the plot 300. First-ninth points 301-309 correspond to Examples 1-9, respectively.

As shown, the first point 301 and the fifth point 305 is located at the smallest and largest boundary, respectively, in the first space 310 for the thickness parameter $\tau$ and the first ratio $R_1$. The second point 302, third point 303, and fourth point 304 are within the second parameter space 320. The sixth-ninth points 306-309 are located at the boundaries of the second parameter space 320.

The pressure loss coefficient Yp (Table 1) is also indicated for the points 301-309. The pressure loss coefficient Yp for an embodiment falling within space 310 can be the same as, smaller than, or larger than Yp for an embodiment falling within the second space 320. As shown, the embodiment 302 and embodiment 303 within the second space 320 have a smaller pressure loss coefficient Yp compared to embodiment 301, which is within the first space 310 and outside of the space 320. In addition, the embodiment 306 within the second space 320 has a larger Yp compared to embodiment 305, which is outside of space 320 and within space 310.

Aspects of the present disclosure provide for a variety of benefits. The thickness parameter and parameter space described herein provides for a geometric envelope producing a rapid thickness expansion forward from the trailing edge, enabling packaging or formation of cooling features closer to the trailing edge than in traditional airfoils. Such cooling feature locations provide for lower required cooling flow, which improves engine SFC. The thickness parameter and parameter space described herein further provides for an airfoil with a higher wedge angle, providing for the local near-trailing-edge thickness increase and available space for cooling features while preserving or improving aerodynamic performance of the airfoil. By co-optimizing the trailing edge shape to balance aerodynamic loss and cooling flow requirements, a more optimal SFC may be attained.

For airfoils with substantial amounts of chargeable flow or turbine cooling flow, such as first- or second-stage blades in the high pressure turbine in some examples, cooling flow performance and aerodynamic performance are both highly impactful on engine SFC or efficiency. Aspects of the disclosure provide for an airfoil with improved cooling performance by way of increased local trailing edge thickness or thickness inflation, as well as improved aerodynamic performance captured in the parameter space described herein.

Aspects of the disclosure further provide for narrowing of multiple factors to a smaller design space for the engine component being manufactured, the location in the engine of the engine component, the materials used, or any other design constraint. Narrowing these multiple factors to a region of possibilities saves time, money, and resources, as well as producing a superior performing airfoil.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A turbine engine, comprising a compressor section, a combustion section, and a turbine section in serial flow arrangement, and an airfoil comprising an outer wall having an exterior surface and bounding an interior, the outer wall defining a pressure side and a suction side and extending between a leading edge and a trailing edge to define a mean camber line extending between the leading edge and trailing edge, a first thickness ($T_1$) defined between the pressure side and the suction side in a first direction perpendicular to the mean camber line of the airfoil at a first location ($L_1$) along the mean camber line, a second thickness ($T_2$) defined between the pressure side and the suction side in a second direction perpendicular to the mean camber line at a second location ($L_2$) along the mean camber line, with the second location $L_2$ positioned farther from the trailing edge than the first location $L_1$, and a distance ($d_T$) defined along the mean camber line between the first location and the second location, wherein the first thickness $T_1$ and the distance $d_T$ define a first ratio ($R_1$) as $R_1 = d_T/T_1$, wherein the first thickness $T_1$, the second thickness $T_2$, and the first ratio $R_1$ are related to each other as $$\left(\frac{T_2}{T_1} - 1\right)/R_1$$

to define a thickness parameter ($\tau$), wherein the thickness parameter $\tau$ is between 0.275 and 0.45 ($0.275 \leq \tau \leq 0.45$) when the first ratio $R_1$ is between 2.5 and 6.5 ($2.5 \leq R_1 \leq 6.5$).

The turbine engine of any preceding clause, wherein the outer wall defines a cooling hole extending between an inlet fluidly coupled to the interior and an outlet on the exterior surface.

The turbine engine of any preceding clause, wherein the outlet is on the suction side.

The turbine engine of any preceding clause, wherein the cooling hole defines a cooling hole distance ($d_H$) along the mean camber line between an aft edge of the cooling hole and the second location $L_2$, wherein the cooling hole distance $d_H$ and the first thickness $T_1$ define a second ratio ($R_2$) as $R_2 = d_H/T_1$.

The turbine engine of any preceding clause, wherein the cooling hole defines a cooling hole width ($w_H$) at the outlet, wherein the cooling hole width $w_H$ and the first thickness $T_1$ define a third ratio ($R_3$) as $R_3 = w_H/T_1$.

The turbine engine of any preceding clause, wherein the second ratio $R_2$ is between 0.3 and 3.0 ($0.3 \leq R_2 \leq 3.0$).

The turbine engine of any preceding clause, wherein the third ratio $R_3$ is between 0.3 and 3.0 ($0.3 \leq R_3 \leq 3.0$).

The turbine engine of any preceding clause, wherein the pressure side and the suction side comprise unwrapped curves ($R\theta$) between the leading edge and the trailing edge as $R\theta = f(s)$.

The turbine engine of any preceding clause, further comprising a curvature (k) of the exterior surface, wherein $$k = \frac{f(s)''}{\left(1 + f(s)'^2\right)^{3/2}}.$$

The turbine engine of any preceding clause, wherein a rate of change of the curvature (k') is defined as $$k' = \frac{\Delta k}{\Delta s}.$$

The turbine engine of any preceding clause, wherein the first location $L_1$ is determined along the mean camber line where the absolute value of the rate of change of the curvature k' is greater than 960 cm$^{-2}$ ($|k'| > 960$ cm$^{-2}$).

The turbine engine of any preceding clause, wherein the first location $L_1$ is determined along the mean camber line where a rate of change of a curvature of the exterior surface exceeds a predetermined threshold.

The turbine engine of any preceding clause, wherein the first ratio $R_1$ and the thickness parameter $\tau$ are within a space bounded by: ($R_1=3.0$, $\tau=0.275$); ($R_1=3.0$, $\tau=0.375$); ($R_1=6.0$, $\tau=0.275$); and ($R_1=6.0$, $\tau=0.325$).

The turbine engine of any preceding clause, wherein the first location $L_1$ is spaced from the trailing edge along the mean camber line to define a first distance.

The turbine engine of any preceding clause, wherein the mean camber line defines a camber length between the leading edge and the trailing edge, and wherein the first distance is between 0-10% of the camber length.

The turbine engine of any preceding clause, wherein the pressure side and the suction side are symmetric about the mean camber line.

An airfoil for a turbine engine, the airfoil comprising an outer wall having an exterior surface and bounding an interior, the outer wall defining a pressure side and a suction side and extending between a leading edge and a trailing edge to define a mean camber line extending between the leading edge and trailing edge, a first thickness ($T_1$) defined between the pressure side and the suction side in a first direction perpendicular to the mean camber line of the airfoil at a first location ($L_1$) along the mean camber line, a second thickness ($T_2$) defined between the pressure side and the suction side in a second direction perpendicular to the mean camber line at a second location ($L_2$) along the mean camber line, with the second location ($L_2$) positioned farther from the trailing edge than the first location ($L_1$), and a distance (d) defined along the mean camber line between the first location and the second location, wherein the first thickness ($T_1$) and the distance (d) define a first ratio ($R_1$) as $R_1 = d/T_1$, wherein the first thickness ($T_1$), the second thickness ($T_2$) and the first ratio ($R_1$) are related to each other as $$\left(\frac{T_2}{T_1} - 1\right)/R_1$$

to define a thickness parameter ($\tau$), wherein the thickness parameter $\tau$ is between 0.275 and 0.45 ($0.275 \leq \tau \leq 0.45$) when the first ratio ($R_1$) is between 2.5 and 6.5 ($2.5 \leq R_1 \leq 6.5$).

The airfoil of any preceding clause, further comprising a cooling hole in the outer wall extending between an inlet fluidly coupled to the interior and an outlet on the exterior surface.

The airfoil of any preceding clause, wherein the cooling hole defines a cooling hole distance ($d_H$) along the mean camber line between an aft edge of the cooling hole and the second location $L_2$, wherein the cooling hole distance $d_H$ and the first thickness $T_1$ define a second ratio ($R_2$) as $R_2 = d_H/T_1$.

The airfoil of any preceding clause, wherein the cooling hole defines a cooling hole width ($w_H$) at the outlet, wherein the cooling hole width $w_H$ and the first thickness $T_1$ define a third ratio ($R_3$) as $R_3 = w_H/T_1$.

The airfoil of any preceding clause, wherein the second ratio $R_2$ is between 0.3 and 3.0 ($0.3 \leq R_2 \leq 3.0$).

The airfoil of any preceding clause, wherein the third ratio $R_3$ is between 0.3 and 3.0 ($0.3 \leq R_3 \leq 3.0$).

The airfoil of any preceding clause, wherein the first location ($L_1$) is determined along the mean camber line where a rate of change of surface curvature of the exterior surface exceeds a predetermined threshold.

The airfoil of claim 13, wherein the first ratio $R_1$ and the thickness parameter $\tau$ are within a space bounded by: ($R_1=3.0$, $\tau=0.275$); ($R_1=3.0$, $\tau=0.375$); ($R_1=6.0$, $\tau=0.275$); and ($R_1=6.0$, $\tau=0.325$).

The airfoil of any preceding clause, wherein the pressure side and the suction side are symmetric about the mean camber line.

What is claimed is:

1. An airfoil for a turbine engine, comprising:
   an outer wall having an exterior surface and bounding an interior, the outer wall defining a pressure side and a suction side and extending between a leading edge and a trailing edge to define a mean camber line extending between the leading edge and the trailing edge;
   a cooling hole extending through the outer wall between an inlet fluidly coupled to the interior and an outlet on the exterior surface;
   a first thickness ($T_1$) defined between the pressure side and the suction side in a first direction perpendicular to the mean camber line at a first location ($L_1$) along the mean camber line, wherein the first thickness $T_1$ is between 0.147 cm and 0.269 cm (0.147 cm $\leq T_1 \leq$ 0.269 cm);
   a second thickness ($T_2$) defined between the pressure side and the suction side in a second direction perpendicular to the mean camber line at a second location ($L_2$) along the mean camber line, wherein the second thickness $T_2$ is between 0.353 cm and 0.693 cm (0.353 cm ≤T₂≤0.693 cm); wherein the second location L₂ positioned farther from the trailing edge than the first location L₁; and a distance (d_T) defined along the mean camber line between the first location L₁ and the second location L₂, wherein the distance d_T is between 0.559 cm and 1.313 cm (0.559 cm≤d_T≤1.313 cm);

wherein the first thickness T₁ and the distance d_T define a first ratio (R₁) as R₁=d_T/T₁, wherein the first ratio R₁ is between 2.5 and 6.5 (2.5≤R₁≤6.5);

wherein the cooling hole defines a cooling hole distance (d_H) along the mean camber line between an aft edge of the cooling hole and the first location L₁, wherein the cooling hole distance d_H is between 0.048 cm and 0.533 cm (0.048 cm≤d_H≤0.533 cm); and wherein the cooling hole distance d_H and the first thickness T₁ define a second ratio (R₂) as R₂=d_H/T₁, wherein the second ratio R₂ is between 0.3 and 3.0 (0.3≤R₂≤3.0).

2. The airfoil of claim 1, wherein the first thickness T₁, the second thickness T₂, and the first ratio R₁ are related to each other as $$\frac{\frac{T_2}{T_1} - 1}{R_1}$$

to define a thickness parameter (τ).

3. The airfoil of claim 2, wherein the first ratio R₁ and the thickness parameter τ are within a space bounded by:
(R₁=3.0, τ=0.275);
(R₁=3.0, τ=0.375);
(R₁=6.0, τ=0.275); and
(R₁=6.0, τ=0.325).

4. The airfoil of claim 1, wherein the outlet is on the pressure side.

5. The airfoil of claim 1, wherein the cooling hole defines a cooling hole width (W_H) at the outlet, wherein the cooling hole width w_H and the first thickness T₁ define a third ratio (R₃) as $$R_3 = \frac{w_H}{T_1}.$$

6. The airfoil of claim 1, wherein the first location L₁ is determined along the mean camber line where a rate of change of a curvature (k') of the exterior surface exceeds a predetermined threshold.

7. The airfoil of claim 6, wherein the rate of change of the curvature is defined as $$k' = \frac{\Delta k}{\Delta s},$$

and wherein the predetermined threshold comprises an absolute value of the rate of change of the curvature k'.

8. The airfoil of claim 1, wherein the pressure side and the suction side are symmetric about the mean camber line.

9. The airfoil of claim 1, wherein the first location L₁ is spaced from the trailing edge along the mean camber line to define a first distance (d₁), wherein the first distance d₁ is between 0.117-0.286 cm (0.117 cm≤d₁≤0.286 cm).

10. The airfoil of claim 9, wherein the mean camber line defines a camber length between the leading edge and the trailing edge, and wherein the first distance d₁ is between 0-10% of the camber length.

11. The airfoil of claim 1, wherein the outer wall comprises an interior surface confronting the interior, and further comprising a plenum distance (d_P) defined between the interior surface and the first location L₁, wherein the plenum distance d_P is between 0.000-0.102 cm (0.000 cm≤d_P≤0.102 cm).

12. The airfoil of claim 1, wherein the cooling hole comprises one of a straight hole, a slot, a diffusing section, a metering section, or a curved section.

13. A turbine engine, comprising:
a compressor section, a combustion section, and a turbine section in serial flow arrangement; and
an airfoil, comprising:
an outer wall having an exterior surface and bounding an interior, the outer wall defining a pressure side and a suction side and extending between a leading edge and a trailing edge to define a mean camber line extending between the leading edge and the trailing edge;
a cooling hole extending through the outer wall between an inlet fluidly coupled to the interior and an outlet on the exterior surface;
a first thickness (T₁) defined between the pressure side and the suction side in a first direction perpendicular to the mean camber line at a first location (L₁) along the mean camber line, wherein the first thickness T₁ is between 0.147 cm and 0.269 cm (0.147 cm≤T₁≤0.269 cm);
a second thickness (T₂) defined between the pressure side and the suction side in a second direction perpendicular to the mean camber line at a second location (L₂) along the mean camber line, wherein the second thickness T₂ is between 0.353 cm and 0.693 cm (0.353 cm≤T₂≤0.693 cm); wherein the second location L₂ positioned farther from the trailing edge than the first location L₁; and
a distance (d_T) defined along the mean camber line between the first location L₁ and the second location L₂, wherein the distance d_T is between 0.559 cm and 1.313 cm (0.559 cm≤d_T≤1.313 cm);
wherein the first thickness T₁ and the distance d_T define a first ratio (R₁) as R₁=d_T/T₁, wherein the first ratio R₁ is between 2.5 and 6.5 (2.5≤R₁≤6.5);
wherein the cooling hole defines a cooling hole distance (d_H) along the mean camber line between an aft edge of the cooling hole and the first location L₁, wherein the cooling hole distance d_H is between 0.048 cm and 0.533 cm (0.048 cm≤d_H≤0.533 cm); and
wherein the cooling hole distance d_H and the first thickness T₁ define a second ratio (R₂) as R₂=d_H/T₁, wherein the second ratio R₂ is between 0.3 and 3.0 (0.3≤R₂≤3.0).

14. The turbine engine of claim 13, wherein the first thickness T₁, the second thickness T₂, and the first ratio R₁ are related to each other as $$\frac{\frac{T_2}{T_1} - 1}{R_1}$$

to define a thickness parameter ($\tau$).

15. The turbine engine of claim 14, wherein the first ratio $R_1$ and the thickness parameter $\tau$ are within a space bounded by:
- ($R_1$=3.0, $\tau$=0.275);
- ($R_1$=3.0, $\tau$=0.375);
- ($R_1$=6.0, $\tau$=0.275); and
- ($R_1$=6.0, $\tau$=0.325).

16. The turbine engine of claim 13, wherein the cooling hole defines a cooling hole width ($w_H$) at the outlet, wherein the cooling hole width $w_H$ and the first thickness $T_1$ define a third ratio ($R_3$) as $$R_3 = \frac{w_H}{T_1}.$$

17. The turbine engine of claim 13, wherein the first location $L_1$ is determined along the mean camber line where a rate of change of a curvature (k') of the exterior surface exceeds a predetermined threshold, wherein the rate of change of the curvature is defined as $$k' = \frac{\Delta k}{\Delta s},$$

and wherein the predetermined threshold comprises an absolute value of the rate of change of the curvature k'.

18. The turbine engine of claim 13, wherein the first location $L_1$ is spaced from the trailing edge along the mean camber line to define a first distance ($d_1$), wherein the first distance $d_1$ is between 0.117-0.286 cm (0.117 cm≤$d_1$≤0.286 cm).

19. The turbine engine of claim 18, wherein the mean camber line defines a camber length between the leading edge and the trailing edge, and wherein the first distance $d_1$ is between 0-10% of the camber length.

20. The turbine engine of claim 19, wherein the cooling hole comprises one of a straight hole, a slot, a diffusing section, a metering section, or a curved section.

* * * * *